US012632409B1

(12) United States Patent
Koh et al.

(10) Patent No.: US 12,632,409 B1
(45) Date of Patent: May 19, 2026

(54) SKIP-HOP COLLECTIVE COMPUTE DATA TRANSFER

(71) Applicant: Amazon Technologies, Inc., Seattle, WA (US)

(72) Inventors: Yongseok Koh, San Jose, CA (US); Se Wang Oh, Campbell, CA (US); Zhaoqi Zhu, San Jose, CA (US); Ron Diamant, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/756,633

(22) Filed: Jun. 27, 2024

(51) Int. Cl.
*G06F 15/173* (2006.01)
*G06F 13/28* (2006.01)

(52) U.S. Cl.
CPC ........ *G06F 15/17375* (2013.01); *G06F 13/28* (2013.01); *G06F 15/17306* (2013.01)

(58) Field of Classification Search
CPC ......... G06F 15/17375; G06F 15/17306; G06F 13/28
USPC .......................................................... 710/316
See application file for complete search history.

(56) References Cited

U.S. PATENT DOCUMENTS 5,386,532 A * 1/1995 Sodos ..................... G06F 13/28
710/22
8,738,860 B1 * 5/2014 Griffin ............... G06F 12/0897
711/122

| | | | | |
|---|---|---|---|---|
| 2009/0040946 | A1 * | 2/2009 | Archer .................... | H04L 12/42 370/255 |
| 2009/0240915 | A1 * | 9/2009 | Faraj ..................... | G06F 9/5066 712/E9.008 |
| 2009/0292905 | A1 * | 11/2009 | Faraj ..................... | G06F 9/5061 712/225 |
| 2009/0307467 | A1 * | 12/2009 | Faraj ........................ | G06F 9/54 712/225 |
| 2013/0151713 | A1 * | 6/2013 | Faraj ....................... | H04L 67/10 709/227 |
| 2016/0094435 | A1 * | 3/2016 | Goss ....................... | H04L 49/10 709/223 |
| 2019/0312772 | A1 * | 10/2019 | Zhao ....................... | H04L 41/12 |
| 2020/0380344 | A1 * | 12/2020 | Lie ........................... | G06N 3/08 |
| 2021/0117130 | A1 * | 4/2021 | Davis ...................... | G06F 3/061 |
| 2021/0248453 | A1 * | 8/2021 | Lauterbach ........... | G06N 3/063 |
| 2021/0286752 | A1 * | 9/2021 | Modukuri ........... | G06F 13/4022 |
| 2022/0057937 | A1 * | 2/2022 | Askar .................. | G11C 29/023 |
| 2022/0374288 | A1 * | 11/2022 | Kibardin ............... | G06N 3/084 |
| 2022/0413759 | A1 * | 12/2022 | Shen ..................... | G06F 3/0604 |

* cited by examiner

*Primary Examiner* — Titus Wong
(74) *Attorney, Agent, or Firm* — Weaver Austin Villeneuve & Sampson LLP

(57) ABSTRACT

Techniques for performing collective compute operations are described. A collective compute operation can be performed in a logical ring of processing ranks formed by a set of rank groups that each contain a number of processing ranks including a primary rank and one or more secondary ranks. At each rank group, a primary rank receives an incoming data slice via an intranode interconnect from a previous primary rank at multiple hops away on the logical ring. A data transfer is performed between the primary rank and each secondary rank of the rank group. An outgoing data slice is then transferred from the primary rank of the rank group to the next primary rank at multiple hops away on the logical ring.

20 Claims, 9 Drawing Sheets

200

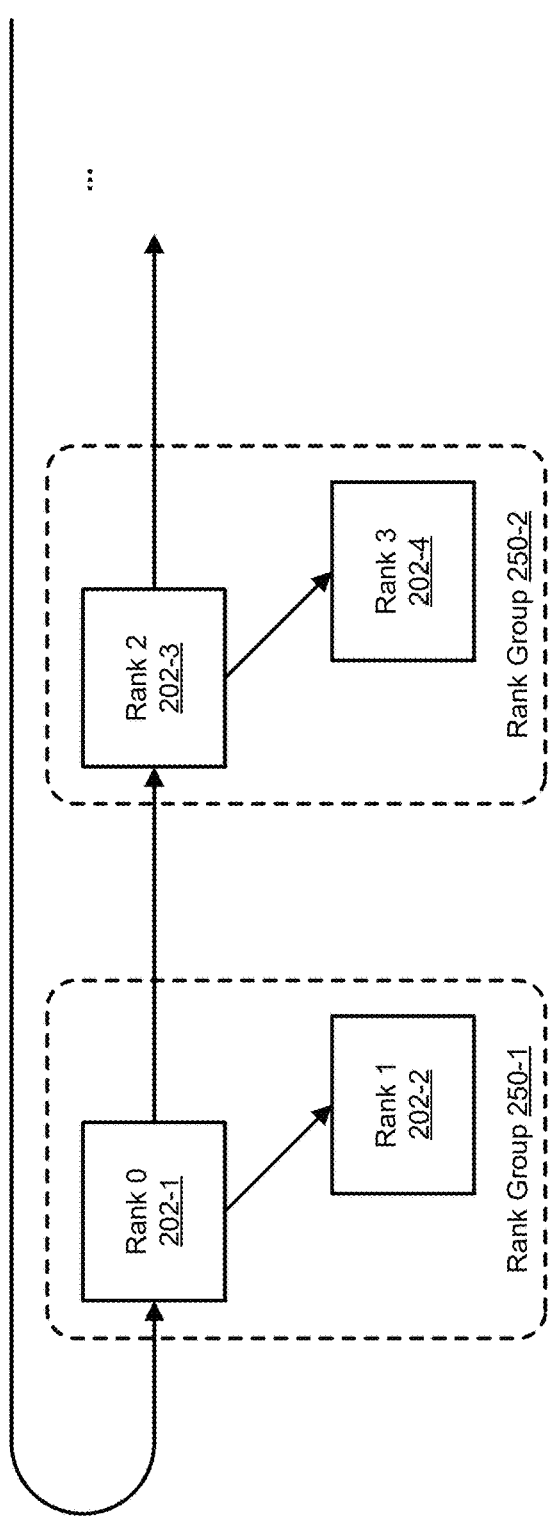
FIG. 2

Reduce-Scatter Using Skip-Hop Transfer multi-hop transfer

Reduce-Scatter Using Single-Hop Transfer single-hop transfer

All-Gather Using
Skip-Hop Transfer

All-Gather Using
Single-Hop Transfer

600

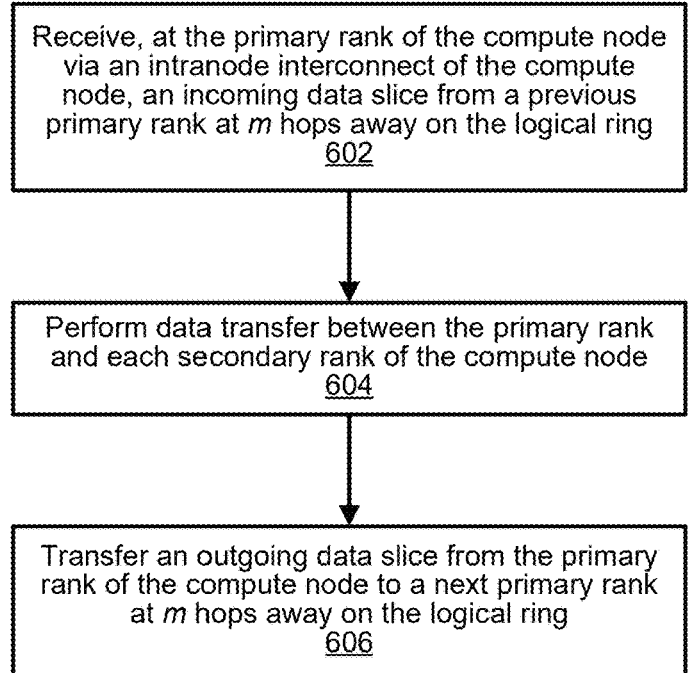

Receive, at the primary rank of the compute node via an intranode interconnect of the compute node, an incoming data slice from a previous primary rank at *m* hops away on the logical ring
602

Perform data transfer between the primary rank and each secondary rank of the compute node
604

Transfer an outgoing data slice from the primary rank of the compute node to a next primary rank at *m* hops away on the logical ring
606

FIG. 6

SKIP-HOP COLLECTIVE COMPUTE DATA TRANSFER

BACKGROUND

Neural networks can be used to perform tasks such as natural language processing. In a neural network, input data is combined with weights to derive output data using activation functions. The set of weights used in a neural network can be determined by a training process in which the neural network can learn how to perform a certain computing task for an application. The weights of the neural network can be adjusted to minimize the differences between the training output data and reference output data. Neural network models such as large language models can generate huge sets of tensor data with millions of model parameters. Performing training and inference on such large models can be a time-consuming process.

BRIEF DESCRIPTION OF THE DRAWINGS

Various embodiments in accordance with the present disclosure will be described with reference to the drawings, in which:

FIG. 2 illustrates an example of a system of processing ranks in a skip-hop logical ring topology;

FIG. 6 illustrates a flow diagram of an example of a process for performing a collective compute operation;

DETAILED DESCRIPTION

Figure 1:
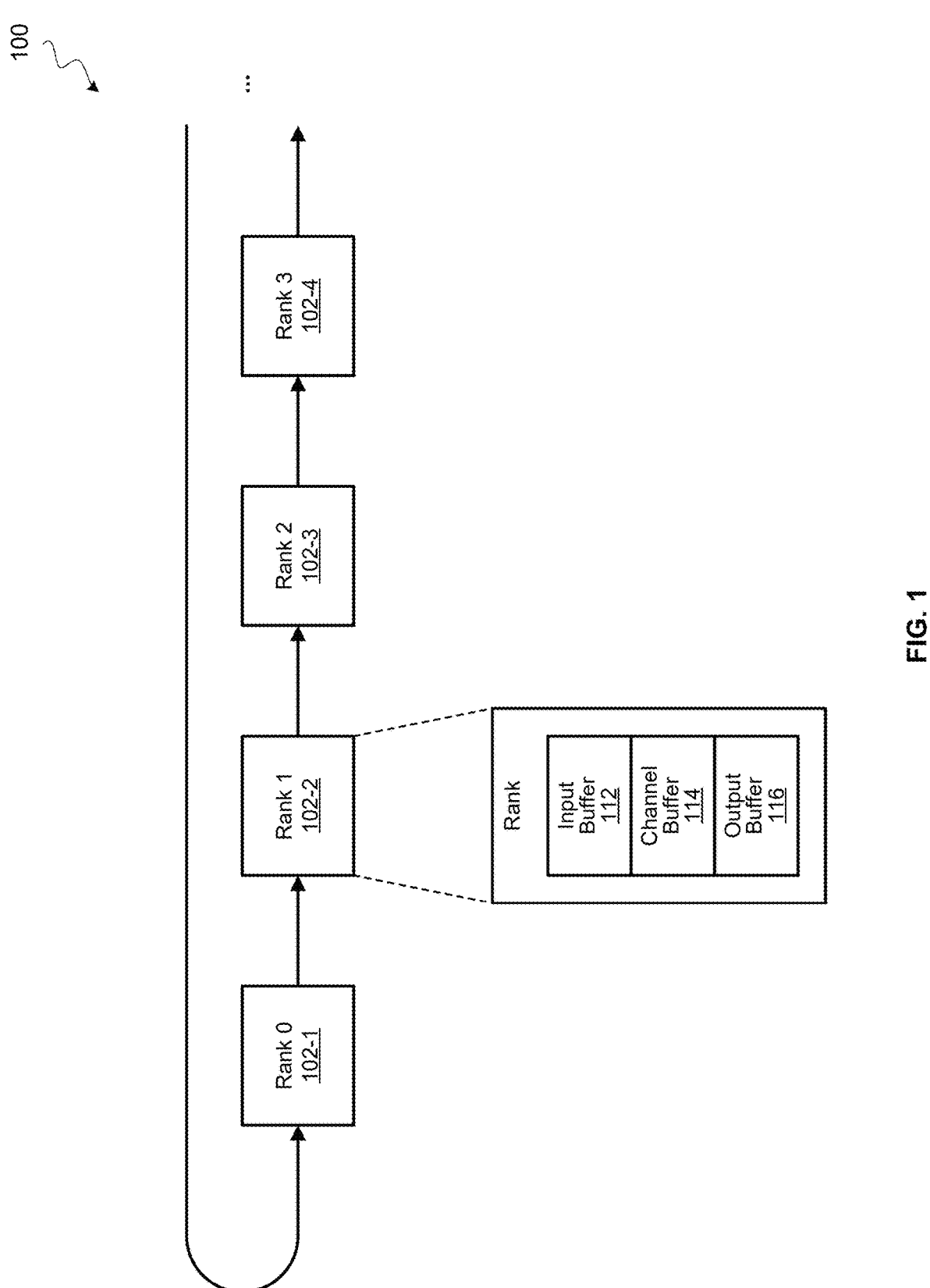
FIG. 1 illustrates an example of a system of processing ranks in a logical ring topology.

A distributed system having multiple processing units or processing ranks can be used to accelerate training and inference by distributing the workload across multiple processing ranks. However, model parameters such as gradients computed by each processing rank to update the weight values during training may have to be synchronized between the processing ranks. Activations during inference operations may also need to be transferred between processing ranks. Collective compute operations such as all-reduce, reduce-scatter, and all-gather can be used to facilitate synchronization and transfer of the tensor data generated by the processing ranks.

A ring-based topology can be effective in performing data transfers between processing ranks. For example, when implementing an all-reduce operation in a ring topology, during the reduce-scatter phase, each processing rank sends a slice of the tensor data to the following processing rank in the ring, and receives a slice of the tensor data from a preceding processing rank in the ring to reduce. All processing ranks perform this for different slices in parallel to pass along a different partially reduced slice at each step. This process continues for multiple steps until each partially reduced slice has made the way around to all processing rank. At the end of the reduce-scatter phase, each respective slice of the tensor data will be fully reduced. Then during an all-gather phase, each processing rank sends a reduced slice of the tensor data to the following processing rank in the ring, and receives a different reduced slice of the tensor data from a preceding processing rank in the ring. All processing ranks perform this for different slices in parallel to pass along a different reduced slice at each step. This process continues for multiple steps until each processing rank has received every reduced slice. However, the execution time of collective compute operations in a ring topology can be directly proportional to the number of processing ranks in the ring due to the hop-to-hop latency along the ring. Thus, for a system with many processing ranks, the execution time of the collective compute operation can be significant.

To improve the execution latency of performing collective compute operations, the techniques disclosed herein perform skip hop data transfers along the ring topology to allow data to be passed to a processing rank that is m hops away, in which m is the number of processing ranks provided in a rank group (e.g., a set of closely coupled processing ranks such as processing ranks provided on the same integrated circuit die). A ring topology utilizing such data transfers can also be referred to as a skip-hop ring topology. Each rank group can designate a primary rank for the logical ring, and each remaining processing rank in the rank group can be designated as a secondary rank for the logical ring. Hence, each primary rank can be arranged at a stride of m processing ranks away from the next primary rank, with one or more secondary ranks in between the two primary ranks along the logical ring. Within each rank group, an intranode interconnect can allow data to be transferred between the primary rank and each secondary rank. Data slices for collective compute operations can be transferred from the primary rank of one rank group to the primary rank of the next rank group at a stride of m. Hence, for a system with N processing ranks, the round-trip data transfer around the ring can be achieved in N/m number of hops as compared to N hops to reduce the latency by a factor of m.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a distributed system of processing ranks arranged in a ring topology. Although only four processing ranks (Rank 0 102-0, Rank 1 102-1, Rank 2 102-2, and Rank 3 102-3) are shown, system 100 can include N number of processing ranks (e.g., eight, twelve, sixteen processing ranks, etc.). Each processing rank in system 100 represents a processing core having one or more tensor processing blocks (TPBs), which can be implemented, for example, using any of a neural network processor, neural network accelerator, a graphics processing unit (GPU), a field programmable gate array (FPGA), a processor or co-processor, an application specific integrated circuit (ASIC), and/or other suitable computing circuitry that may support the arithmetic operations (e.g., matrix multiplication) involved in the training or inference process of a neural network.

To facilitate data transfers between the processing ranks, system 100 may include direct memory access (DMA) engines that can read and write data to memory locations without involving a host processor. Each DMA engine may include read and write queues. The read queues can be configured with memory descriptors indicating source locations of the data being transfer, and the write queues can be configured with memory descriptors indicating target locations of where the data is to be stored. In some implementations, each processing rank may include one or more DMA engines that can access the memory system of other processing ranks. Each processing rank may include a main memory (e.g., implemented using high bandwidth memory (HBM)) and a cache memory such as a state buffer memory. DMA operations can be used to transfer data within the main memory, within the cache memory, and/or between the main memory and the cache memory of a processing rank, and/or between processing ranks.

In some implementations, some or all of the DMA engines may include integrated arithmetic circuitry to perform computations on the data being transferred by the DMA engine. For example, the integrated arithmetic circuitry may perform a reduce operation (e.g., sum, average, median, etc.) on the data being read from source locations, and write the reduced data to a target location. This can further reduce the execution time of collective compute operations because arithmetic operations can be performed in flight during the data transferred. The particular arithmetic operator to perform on the data can be specified, for example, in the memory descriptors of the data transfer. In the following description, certain operations may be described with reference to a processing rank performing the operation such as obtaining data, providing data, and/or reducing data. It should be understood that references to such can mean that the operations are performed by one or more DMA engines that are servicing data transfers for the processing rank.

Referring to FIG. 1, the memory space of each of the processing ranks may allocate space for an input buffer 112, a channel buffer 114, and an output buffer 116 for collective compute operations. These buffers can be implemented, for example, using the main memory (e.g., HBM) of the processing rank. In some implementations, these buffers can be implemented in the cache memory (e.g., state buffer), or using a combination of both memories. In some instances, the memory locations of a buffer may change during the course of execution. This may occur, for example, if the values stored at a memory location is no longer needed, and the memory location can be repurposed for a different buffer.

The input buffer 112 may store the tensor data that is subject to the collective compute operation. For example, the tensor data may include data generated by the processing rank such as gradients computed by the processing rank during a backward propagation phase of training, or activations computed by the processing rank during an inference operation. The channel buffer 114 may store data obtained from other processing ranks as well as data copied from the input buffer 112 of the same processing rank. The channel buffer 114 can act as a scratchpad to store intermediate data computed by the processing rank as part of the collective compute operation such as partially reduced data. The output buffer 116 may store the results of the collective compute operation. The output buffer 116 may store results such as fully reduced data computed by the processing rank, as well as collective compute results obtained from other processing ranks. Although the buffers are shown to have similar sizes, it should be understood that the sizes of the respective buffers can vary. For example, the size of the channel buffer 114 can be smaller than the input and/or output buffers because values that are no longer needed in the channel buffer can be overwritten during the collective compute operation.

During a collective compute operation, each processing rank in system 100 may transfer a data slice to the next processing rank, with the last processing rank transferring data back to the first processing rank to form a ring. In such a ring topology, each processing rank transfers data to the next hop along the ring. The latency for each processing rank to obtain a data slice from each of the other processing ranks for a collective compute operation scales with the number of processing ranks in the ring. Given that that data transfer bandwidth between processing ranks is generally fixed, one way to reduce execution time of the collective compute operation is to reduce the latency of the data transfers along the logical ring.

FIG. 2 illustrates another example of a distributed system 200 of processing ranks arranged in a ring topology. System 200 may include N number of processing ranks. In the example shown, two processing ranks can be implemented as a rank group. Each rank group can be, for example, an individual integrated circuit die that contains two processing cores, in which each processing core represents a processing rank. Hence, rank group 250-1 may include processing ranks Rank 0 202-1 and Rank 1 202-2; computer node 250-2 may include processing ranks Rank 2 202-3 and Rank 3 202-4, etc. It should be understood that in other implementations, each rank group may include more than two processing ranks. More generally, each rank group may contain m number if processing ranks, with m being an integer greater than 1. In some implementations, a rank group (e.g., an integrated circuit die) can be implemented in a system-on-chip (SoC). Multiple rank groups can also be implemented in a single SoC.

Within each rank group, the processing ranks may exchange data via an intranode interconnect. The intranode interconnect can be, for example, an interconnect fabric that allows each of the processing ranks in the rank group to access the memory of the other processing ranks in the rank group. For example, the intranode interconnect between Rank 0 and Rank 1 may allow Rank 0 to access the HBM of Rank 1, and Rank 1 to access the HBM of Rank 0.

Within each rank group, a processing rank can be assigned as a primary rank with each remaining processing rank being designated as a secondary rank. For example, Rank 0 202-1 in rank group 250-1 can be a primary rank, and Rank 1 202-2 in rank group 250-2 can be a secondary rank. Any additional processing ranks within the rank group is designated as a secondary rank. It should also be noted that a processing rank can belong to more than one logical ring, and the processing rank can be designated as a primary rank for one logical ring but as a secondary rank for a different logical ring.

Data transfers in system 200 between rank groups can be performed via a chip-to-chip interconnect. The chip-to-chip interconnect can be, for example, a peripheral component interconnect (PCI) such as PCI express (PCIe), or other suitable chip-to-chip interconnects. It should also be noted that each rank group may include multiple pairs of chip-to-chip interconnect channels. This may allow the rank groups to be coupled in more than one logical ring, with each logical ring utilizing a pair of chip-to-chip interconnect channels of the rank group.

During a collective compute operation, the primary rank of each rank group in system 200 may transfer a data slice to the next primary rank along the logical ring. In such a ring topology, each primary rank transfers data at a stride of m hops away to the next primary rank along the ring. Hence, the immediate next hop is skipped when m is 2. For m greater than 2, the (m−1) immediate next hops can be skipped. Accordingly, the data transfer technique can be referred to as skip-hop data transfer. Within each rank group, the processing ranks can transfer data slices via the intranode interconnect of the rank group. The data transfers between processing ranks of a rank group on the intranode interconnect can be performed concurrently or in parallel with the data transfers being carried out on the chip-to-chip interconnect between primary ranks. In this manner, the latency for each processing rank to obtain a data slice from each of the other processing ranks for a collective compute operation can be reduced by a factor of m.

Figures 3A, 3B:
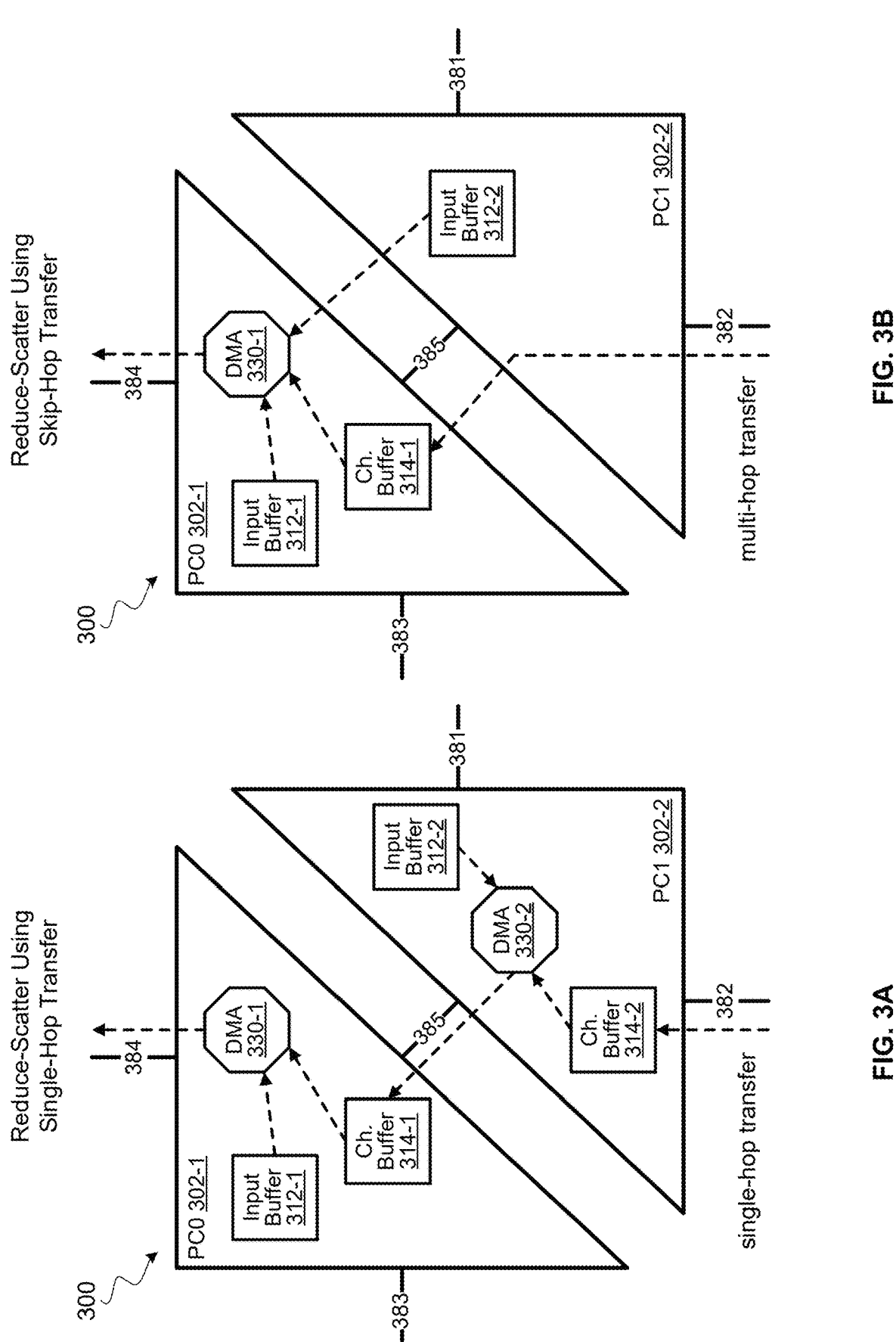
FIG. 3A illustrates an example of performing a reduce-scatter operation in a logical ring topology.
FIG. 3B illustrates an example of performing a reduce-scatter operation in a skip-hop logical ring topology.

FIG. 3A illustrates an example of performing a scatter-gather operation using single-hop data transfers in a rank group 300 of a logical ring. Rank group 300 may include a processing core PC0 302-1 representing a processing rank and a processing core PC1 302-2 representing another processing rank. Rank group 300 may include four chip-to-chip interconnect channels including chip-to-chip intercon-nect 381, 382, 383, and 384. Chip-to-chip interconnect channel 382 connects to a previous processing rank of PC1 302-2 along the logical ring, and chip-to-chip interconnect channel 384 connects to the next processing rank from PC0 302-1 along the logical ring. Although not shown, chip-to-chip interconnect channels 381 and 383 can be connected to a different logical ring.

PC0 302-1 includes input buffer 312-1, channel buffer 314-1, output buffer (not shown), and DMA engine 330-1. PC1 302-2 includes input buffer 312-2, channel buffer 314-2, output buffer (not shown), and DMA engine 330-2. PC0 302-1 is connected to PC1 302-2 via an intranode interconnect 385. Intranode interconnect 385 allows PC1 302-2 to access the memory of PC0 302-1, and PC0 302-1 to access the memory of PC1 302-2.

For a scatter-gather operation, a previous processing rank may transfer an incoming data slice to channel buffer 314-2 via chip-to-chip interconnect 382. The incoming data slice can be a data slice from an input buffer of the previous processing rank if this is the start of the scatter-gather operation, or can be a partially reduced data slice (e.g., partial sum) from the channel buffer of the previous processing rank. DMA engine 330-2 of PC1 302-2 may then obtain the incoming data slice from channel buffer 314-2 and a data slice from the input buffer 312-2, and perform a reduction operation on the two data slices to generate an outgoing data slice for placement into channel buffer 314-1 of PC0 302-1. The outgoing data slice generated by DMA engine 330-2 can be transferred to channel buffer 314-1 via intranode interconnect 385.

Next, DMA engine 330-1 of PC1 302-1 may obtain the data slice generated by DMA engine 330-2 from channel buffer 314-1 and a data slice from the input buffer 312-1, and perform a reduction operation on the two data slices to generate an outgoing data slice for placement into the channel buffer of the next processing rank. The outgoing data slice generated by DMA engine 330-1 can be trans-ferred to channel buffer of via chip-to-chip interconnect interconnect 384.

The outgoing data slice generated by DMA engine 330-1 is a reduction of three data slices including the incoming data slice received by PC1 302-2 (which can be a partially reduce data slice), and the two data slices of PC1 302-2 and PC0 302-1. To generate this outgoing data slice using single-hop data transfers, two sets of 2R1 W (two reads one write) memory accesses are utilized. The first set of 2R1 W memory accesses reads from the input buffer 312-2 and channel buffer 314-2, and writes to channel buffer 314-2. The second set of 2R1 W memory accesses reads from the input buffer 312-1 and channel buffer 314-1, and writes to the channel buffer of the next processing rank.

FIG. 3B illustrates an example of performing a scatter-gather operation using skip-hop data transfers in rank group 300 of a logical ring. In FIG. 3B, PC0 302-1 can be assigned as the primary rank of rank group 300, and thus PC1 302-2 can be a secondary rank. Referring to FIG. 3B, for a scatter-gather operation, channel buffer 314-1 of the primary rank PC0 302-1 may receive an incoming data slice from a previous primary rank on the logical ring via chip-to-chip interconnect 382. The previous primary rank is m hops away from primary rank PC0 302-1 along the logical ring. The incoming data slice can be a data slice from an input buffer of the previous processing rank if this is the start of the scatter-gather operation, or can be a partially reduced data slice (e.g., partial sum) from the channel buffer of the previous processing rank. The previous primary rank can access channel buffer 314-1 of primary rank PC0 302-1 even though the previous primary rank is connected to PC1 302-2 through chip-to-chip interconnect 382, because intranode interconnect 385 allows PC1 302-2 to access the memory of PC0 302-1. Hence, the previous primary rank can place the incoming data slice into channel buffer 314-1 through PC1 302-2 without having to first store the data slice in channel buffer of PC1 302-2.

Next, DMA engine 330-1 of primary rank PC0 302-1 can obtain a data slice from input buffer 312-1 of PC0 302-1 (referred to as a primary rank data slice), a data slice from input buffer 312-2 of PC1 302-2 (referred to as a secondary rank data slice), and reduce these data slices with the incoming data slice from channel buffer 314-1. The second-ary rank data slice can be obtained via intranode intercon-nect 385. In implementations in which rank group 300 includes more than one secondary rank, each of the second-ary rank data slices from the respective secondary ranks can be reduces together with the incoming data slice and the primary rank data slice. The resulting outgoing data slice can be placed into the channel buffer of the next primary data rank, which is m hops away from primary rank PC0 302-1, via chip-to-chip interconnect 384.

As compared to the single-hop transfer of FIG. 3A, this outgoing data slice using skip-hop data transfer can be generated by utilizing a set of 3R1 W (three reads one write) memory accesses. The set of 3R1 W memory accesses reads from the input buffer 312-2 of secondary rank PC1 302-2, input buffer 312-1 of primary rank PC0 302-1, and channel buffer 314-1 of primary rank PC0 302, and writes to channel buffer of the next primary rank. Hence, a total of four memory accesses is used as compared to the six memory accesses for the single-hop data transfer of FIG. 3A. Accord-ingly, in addition to reducing the data transfer latency, the skip-hop data transfer technique of FIG. 3B also lowers the memory pressure by reducing the number of memory accesses made to the memory of the rank group to perform the reduce-scatter collective compute operation.

Figures 4A, 4B:
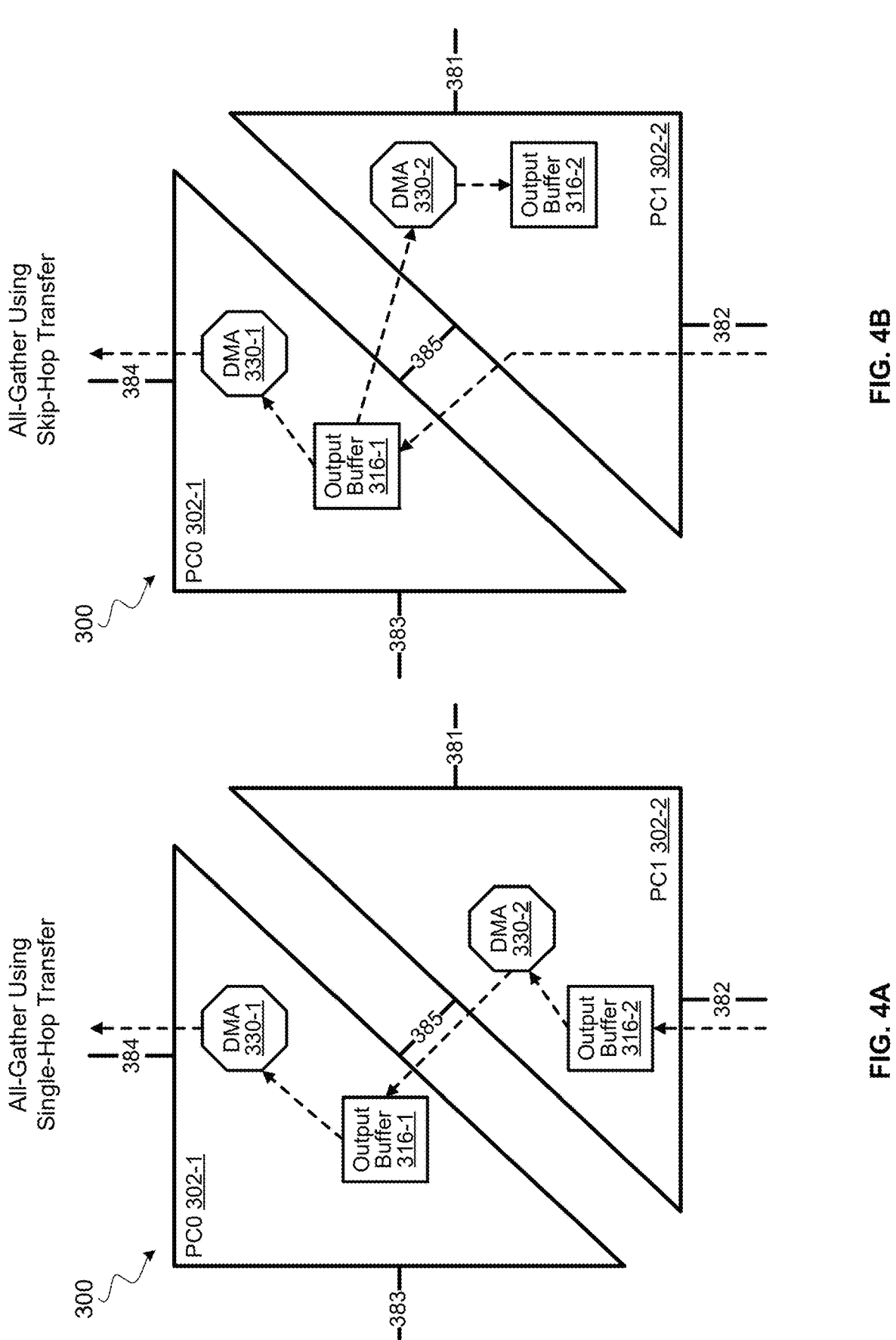
FIG. 4A illustrates an example of performing an all-gather operation in a logical ring topology.
FIG. 4B illustrates an example of performing an all-gather operation in a skip-hop logical ring topology.

FIG. 4A illustrates an example of performing an all-gather operation using single-hop data transfers in rank group 300 of a logical ring. For an all-gather operation, output buffer 316-2 of PC1 302-2 may receive an incoming data slice from a previous primary rank on the logical ring via chip-to-chip interconnect 382. The incoming data slice can be placed directly into output buffer 316-2 of PC1 302-2 because the all-gather operation does not perform computations on the data slices, but merely distributes them to the processing ranks. The incoming data slice can be a data slice from the output buffer of the previous processing rank. Next, DMA engine 330-2 of PC1 302-2 may obtain the incoming data slice from output buffer 316-2, and place the data slice into output buffer 316-1 of PC0 302-0 at the next hop via intranode interconnect 385. DMA engine 330-1 of PC0 302-1 may obtain the incoming data slice from output buffer 316-1, and place the data slice into the output buffer 0 of the next processing rank at the next hop via chip-to-chip interconnect 384.

FIG. 4B illustrates an example of performing an all-gather operation using skip-hop data transfers in rank group 300 of a logical ring. In FIG. 4B, PC0 302-1 can be assigned as the primary rank of rank group 300, and thus PC1 302-2 can be a secondary rank. For an all-gather operation, output buffer 316-1 of the primary rank PC0 302-1 may receive an incoming data slice from a previous primary rank on the logical ring via chip-to-chip interconnect 382. The previous primary rank is m hops away from primary rank PC0 302-1 along the logical ring. The incoming data slice can be a data slice from an output buffer of the previous processing rank. The previous primary rank can access output buffer 316-1 of primary rank PC0 302-1 even though the previous primary rank is connected to PC1 302-2 through chip-to-chip interconnect 382, because intranode interconnect 385 allows PC1 302-2 to access the memory of PC0 302-1. Hence, the previous primary rank can place the incoming data slice into channel buffer 316-1 through PC1 302-2 without having to first store the data slice in PC1 302-2.

Next, DMA engine 330-1 of primary rank PC0 302-1 can obtain the data slice from output buffer 316-1 of PC0 302-1, and provide the data slice as an outgoing data slice to the next primary rank at m hops away via chip-to-chip interconnect 384. The data slice can be placed into the output buffer of the next primary rank. Meanwhile, DMA engine 330-2 of secondary rank PC1 302-2 can also obtain the data slice from output buffer 316-1 of PC0 302-1, and provide the data slice to output buffer 316-2 of PC1 302-2 via intranode interconnect 385. The data transfer to output buffer 316-2 of PC1 302-2 can be performed concurrently or in parallel to the data transfer to output buffer 316-1 of PC0 302-1. As compared to the single-hop data transfer approach of FIG. 4A, the latency to distribute the data slice to all processing ranks of the logical ring can be reduced by a factor of m, with m being 2 in the example shown.

To perform an all-reduce collective compute operation, a reduce-scatter operation can be performed, follow by an all-gather operation. Hence, to apply the skip-hop technique to all-reduce, the operation of FIG. 3B can be performed during the reduce-scatter phase, and the operation of FIG. 4B can be performed during the all-gather phase. The skip-hop data transfer technique can reduce the data transfer latency by a factor of m in both phases of the all-reduce operation, and can also lower the memory pressure during the reduce-scatter phase of the all-reduce operation.

Figure 5:
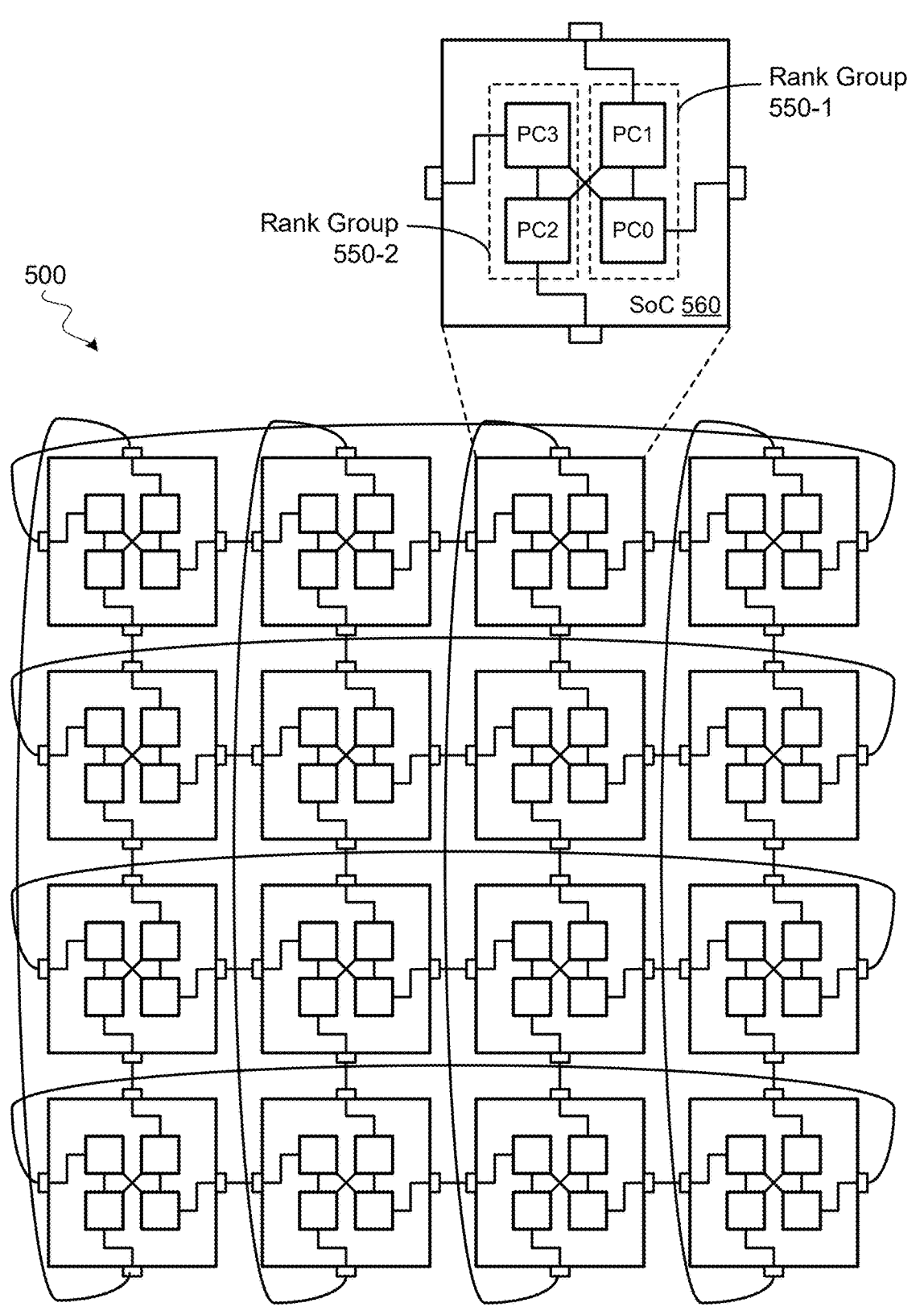
FIG. 5 illustrates an example of a system having multiple system-on-chips.

FIG. 5 illustrates an example of a computing system 500 in which the skip-hop data transfer techniques disclosed herein can be implemented. In the example shown, system 500 may include 16 system-on-chips (SoCs). Each SoC 560 includes two rank groups 550-1 and 550-2, and each rank group includes two processing cores with m being a value of 2. Hence, system 500 may include a total of 64 processing ranks. System 500 can be used to implement a logical ring of 64 processing ranks, or other topologies such as 4 logical rings of 16 processing ranks in each ring (e.g., a ring in each row, each column, or both).

Referring to SoC 560, to implement skip-hop data transfers, processing core PC1 and processing core PC3 of each SoC can be assigned as the primary rank of the corresponding rank group, and the data transfer latency in system 500 can be reduced by a factor of 2. In other implementations, if the intranode interconnect fabric allows each processing rank on a SoC to access the memory of the other three processing ranks in the SoC, each SoC may correspond to an individual rank group having four processing ranks. In such implementations, m has a value of 4 and the data transfer latency in system 500 can be reduced by a factor of 4.

FIG. 6 illustrates a flow diagram of an example of a process 600 for performing a collective computation or collection compute operation on tensor data in a system with multiple processing ranks. The system with multiple processing ranks can be arranged in a logical ring topology, and may include a set of rank groups each containing m number of processing ranks. It should be noted that the system of processing ranks need not be in a physical ring. The logical ring can be formed by traversing communication paths coupled between the processing ranks along a ring topology. It should also be noted that a processing rank can belong to more than one logical ring, and that the system of processing ranks can be coupled in a manner to support other topologies in addition to the ring topology.

Each rank group in the system may include a primary rank, and each remaining processing rank of the rank group can be designated as a secondary rank. Hence, a rank group having m processing ranks may include a primary rank and m−1 secondary rank(s). A compiler or runtime software may assign the primary rank in each rank group. Each primary rank is m hops away from the next primary rank along the logical ring. The primary rank and each secondary rank within a rank group can transfer data using an intranode interconnect that allows each processing rank to access the memory of the other processing rank(s) in the rank group.

In some implementations, process 600 can be implemented on a non-transitory computer-readable medium as instructions or code executable by a host processor to execute the collective compute operation in the multiple processing ranks. In some implementations, the collective compute operation performed by process 600 can be an all-reduce operation, a reduce-scatter operation, an all-gather operation, or other suitable collective compute operation, etc. In some implementations, the collective compute operation can be performed as part of the execution of a neural network model.

The data transfers involved in performing process 600 can be carried out by one or more DMA engines executing DMA transactions to move data slices between the memories (e.g., main memory such as HBM, cache memory such as state buffer, etc.) of the processing ranks. In some implementations, the DMA engines may include integrated arithmetic circuitry to perform reduce operations (e.g., summation, average, median, etc.) or other computations on-the-fly on the data read from source memory locations to generate data (e.g., reduced or partially reduced data) for storing to a target memory location.

Prior to executing process 600, the processing ranks of the system may have generated a tensor data that is subjected to a collective compute operation. Each of the processing ranks can store the generated tensor data in an input buffer (e.g., implemented in the main memory or cache memory) of the processing rank. The tensor data can be partitioned into data slices according to the number of processing ranks in the logical ring. Process 600 can be performed at each rank group of the logical ring.

Process 600 and may begin at block 602 by receiving, at the primary rank of the rank group via an intranode interconnect of the rank group, an incoming data slice from a previous primary rank at m hops away on the logical ring. For a reduce-scatter or similar operation that performs further computation of the incoming data slice, the incoming data slice can be received at a channel buffer of the primary rank. For an all-gather or similar operation that distributes the incoming data slice, the incoming data slice can be received at an output buffer of the primary rank.

At block 604, data transfer between the primary rank and each secondary rank of the rank group can be performed via the internode interconnect of the rank group. For a reduce-scatter or similar operation, the data transfer between the primary rank and each secondary rank of the rank group may include obtaining, by the direct memory access (DMA) engine of the primary rank, a primary rank data slice from an input buffer of the primary rank, a secondary rank data slice from an input buffer of each secondary rank, and the incoming data slice from the channel buffer of the primary rank. The DMA engine may generate an outgoing data slice for the rank group by reducing the incoming data slice, the primary rank data slice, and each secondary rank data slice. For an all-gather or similar operation, the data transfer between the primary rank and each secondary rank of the rank group may include obtaining, by the DMA engine of each secondary rank, the incoming data slice from the output buffer of the primary rank, and transferring the incoming data slice to an output buffer of each secondary rank.

At block 606, an outgoing data slice can be transferred from the primary rank of the rank group to a next primary rank at m hops away on the logical ring. For a reduce-scatter or similar operation, the outgoing data slice can be transferred to a channel buffer of the next primary rank on the logical ring. For an all-gather or similar operation, the incoming data slice from the output buffer of the primary rank is used as the outgoing data slice, and is transferred to a channel buffer of the next primary rank on the logical ring. To perform an all-reduce operation, process 600 can be repeated to implement a reduce-scatter operation followed by an all-gather operation.

Figure 7:
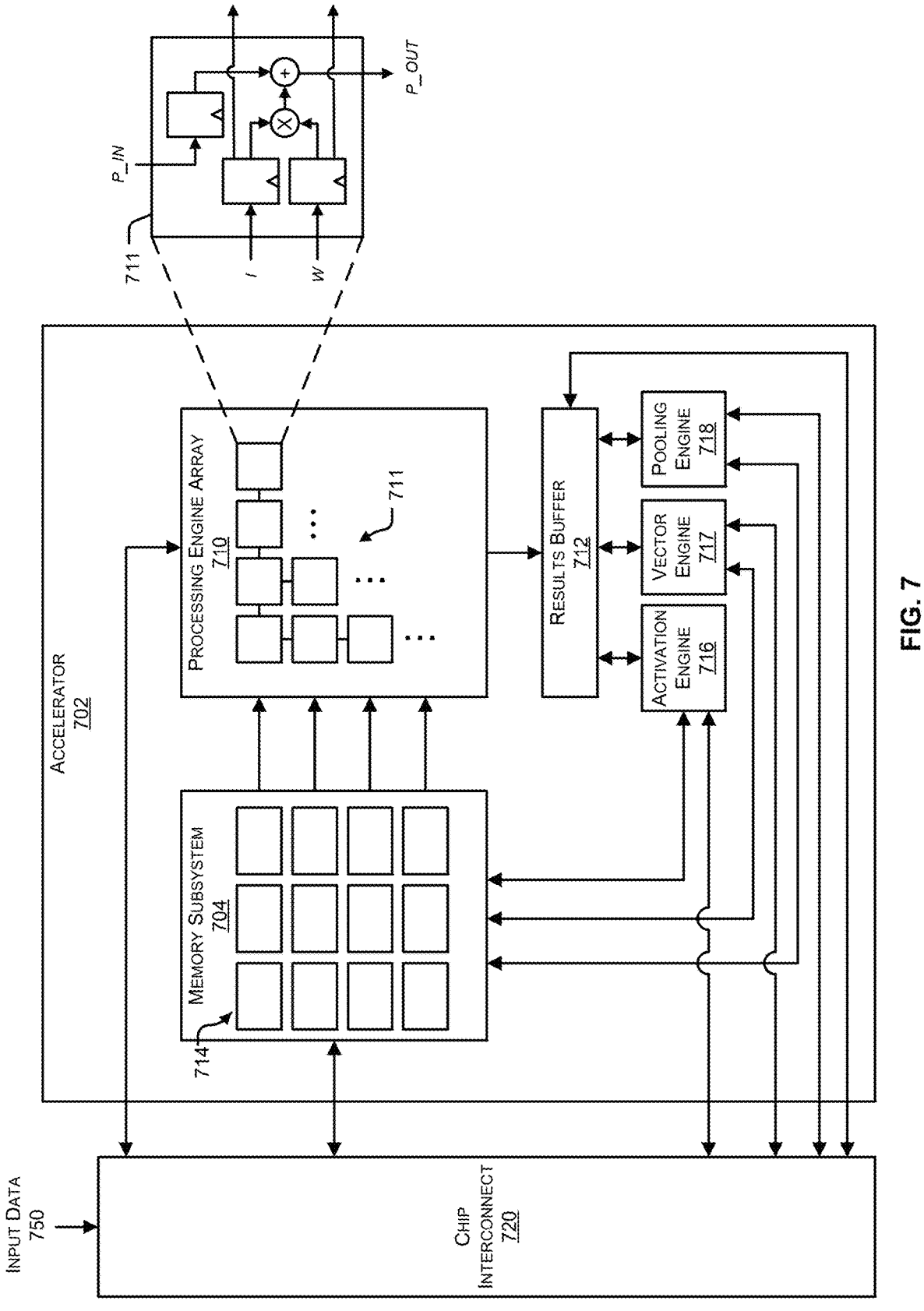
FIG. 7 illustrates a block diagram of an example of an integrated circuit device.

FIG. 7 is a block diagram illustrating an example of an integrated circuit device that can be use as a processing rank. The example of FIG. 7 illustrates an accelerator 702. In various examples, the accelerator 702, for a set of input data (e.g., input data 750), can execute computations using a processing engine array 710, an activation engine 716, a vector engine 717, and/or a pooling engine 718. In some examples, the example accelerator 702 may be an integrated circuit component of a processor, such as a neural network processor. The processor may have other integrated circuit components, including additional accelerator engines.

In various implementations, the memory subsystem 704 can include multiple memory banks 714. Memory subsystem 704 can also be referred to as a state buffer. In these implementations, each memory bank 714 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 714. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 704 can permit simultaneous access to the read or write channels of multiple memory banks. As another example, the memory subsystem 704 can include arbitration logic such that arbitration between, for example, the outputs of multiple memory banks 714 can result in more than one memory bank's output being used. In these and other examples, though globally managed by the memory subsystem 704, each memory bank can be operated independently of any other.

Having the memory banks 714 be independently accessible can increase the efficiency of the accelerator 702. For example, values can be simultaneously read and provided to each row of the processing engine array 710, so that the entire processing engine array 710 can be in use in one clock cycle. As another example, the memory banks 714 can be read at the same time that results computed by the processing engine array 710 are written to the memory subsystem 704. In contrast, a single memory may be able to service only one read or write at a time. With a single memory, multiple clock cycles can be required, for example, to read input data for each row of the processing engine array 710 before the processing engine array 710 can be started.

In various implementations, the memory subsystem 704 can be configured to simultaneously service multiple clients, including the processing engine array 710, the activation engine 716, the vector engine 717, the pooling engine 718, and any external clients that access the memory subsystem 704 over a communication fabric 720. In some implementations, being able to service multiple clients can mean that the memory subsystem 704 has at least as many memory banks as there are clients. In some cases, each row of the processing engine array 710 can count as a separate client. In some cases, each column of the processing engine array 710 can output a result, such that each column can count as a separate write client. In some cases, output from the processing engine array 710 can be written into the memory banks 714 that can then subsequently provide input data for the processing engine array 710. As another example, the activation engine 716, the vector engine 717, and the pooling engine 718 can include multiple execution channels, each of which can be separate memory clients. The memory banks 714 can be implemented, for example, using static random access memory (SRAM).

In various implementations, the memory subsystem 704 can include control logic. The control logic can, for example, keep track of the address spaces of each of the memory banks 714, identify memory banks 714 to read from or write to, and/or move data between the memory banks 714. In some implementations, memory banks 714 can be hardwired to particular clients. For example, a set of memory banks 714 can be hardwired to provide values to the rows of the processing engine array 710, with one memory bank servicing each row. As another example, a set of memory banks can be hard wired to receive values from columns of the processing engine array 710, with one memory bank receiving data for each column.

The processing engine array 710 is the computation matrix of the example accelerator 702. The processing engine array 710 can, for example, execute parallel integration, convolution, correlation, and/or matrix multiplication, among other things. The processing engine array 710 includes multiple processing engines 711, arranged in rows and columns, such that results output by one processing engine 711 can be input directly into another processing engine 711. Processing engines 711 that are not on the outside edges of the processing engine array 710 thus can receive data to operate on from other processing engines 711, rather than from the memory subsystem 704.

In various examples, the processing engine array 710 uses systolic execution, in which data arrives at each processing engine 711 from different directions at regular intervals. In some examples, input data can flow into the processing engine array 710 from the left and weight values can be loaded at the top. In some examples weights and input data can flow from the left and partial sums can flow from top to bottom. In these and other examples, a multiply-and-accumulate operation moves through the processing engine array 710 as a diagonal wave front, with data moving to the right and down across the array. Control signals can be input at the left at the same time as weights, and can flow across and down along with the computation.

In various implementations, the number of columns in the processing engine array 710 determines the computational capacity of the processing engine array 710, and the number of rows determines the required memory bandwidth for achieving maximum utilization of the processing engine array 710. The processing engine array 710 can have, for example, 64 columns and 128 rows, or some other number of columns and/or rows.

An example of a processing engine 711 is illustrated in FIG. 7 in an inset diagram. As illustrated by this example, a processing engine 711 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 711.

In the illustrated example, an input from above can include a partial sum, p_in, provided either from another processing engine 711 or from a previous round of computation by the processing engine array 710. When starting a computation for a new set of input data, the top row of the processing engine array 710 can receive a fixed value for p_in, such as zero. As illustrated by this example, i and w are multiplied together and the result is summed with p_in to produce a new partial sum, p_out, which can be input into another processing engine 711. Various other implementations of the processing engine 711 are possible.

Outputs from the last row in the processing engine array 710 can be temporarily stored in the results buffer 712. The results can be intermediate results, which can be written to the memory banks 714 to be provided to the processing engine array 710 for additional computation. Alternatively, the results can be final results, which, once written to the memory banks 714 can be read from the memory subsystem 704 over the communication fabric 720, to be output by the system.

In some implementations, the accelerator 702 includes an activation engine 716. In these implementations, the activation engine 716 can combine the results from the processing engine array 710 into one or more output activations. For example, for a convolutional neural network, convolutions from multiple channels can be summed to produce an output activation for a single channel. In other examples, accumulating results from one or more columns in the processing engine array 710 may be needed to produce an output activation for a single node in the neural network. In some examples, activation engine 716 can be bypassed.

In various examples, the activation engine 716 can include multiple separate execution channels. In these examples, the execution channels can correspond to the columns of the processing engine array 710, and can perform an operation on the outputs of a column, the result of which can be stored in the memory subsystem 704. In these examples, the activation engine 716 may be able to perform between 1 and n parallel computations, where n is equal to the number of columns in the processing engine array 710. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 702 can include a pooling engine 718. Pooling is the combining of outputs of the columns of the processing engine array 710. Combining can include for example, computing a maximum value, a minimum value, an average value, a median value, a summation, a multiplication, or another logical or mathematical combination. In various examples, the pooling engine 718 can include multiple execution channels that can operating on values from corresponding columns of the processing engine array 710. In these examples, the pooling engine 718 may be able to perform between 1 and n parallel computations, where n is equal to the number of columns in the processing engine array 710. In various examples, execution channels of the pooling engine 718 can operate in parallel and/or simultaneously. In some examples, the pooling engine 718 can be bypassed.

In some implementations, the accelerator 702 can further include a vector engine 717. Vector engine 717 is a compute engine that can perform computations and manipulations on values stored in memory subsystem 704 and/or results buffer 712 such as values representing matrices of input values, weight values, intermediate results, etc. Vector engine 717 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 717 can operate in parallel and/or simultaneously. In some examples, the vector engine 717 can be bypassed or be omitted.

Herein, the activation engine 716, the vector engine 717, and the pooling engine 718 may be referred to collectively as execution engines. The processing engine array 710 is another example of an execution engine. Another example of an execution engine is a Direct Memory Access (DMA) engine, which may be located outside the accelerator 702.

Input data 750 can arrive over the communication fabric 720. The communication fabric 720 can connect the accelerator 702 to other components of a processor, such as a DMA engine that can obtain input data 750 from an Input/Output (I/O) device, a storage drive, or a network interface. The input data 750 can be, for example one-dimensional data, such as a character string or numerical sequence, or two-dimensional data, such as an array of pixel values for an image or frequency and amplitude values over time for an audio signal. In some examples, the input data 750 can be three-dimensional, as may be the case with, for example, the situational information used by a self-driving car or virtual reality data. In some implementations, the memory subsystem 704 can include a separate buffer for the input data 750. In some implementations, the input data 750 can be stored in the memory banks 714 when the accelerator 702 receives the input data 750.

In some examples, the accelerator 702 can implement a neural network processing engine. In these examples, the accelerator 702, for a set of input data 750, can execute a neural network to perform a task for which the neural network was trained. Executing a neural network on a set of input data can be referred to as inference or performing inference.

The weights for the neural network can be stored in the memory subsystem 704, along with input data 750 on which the neural network will operate. The neural network can also include instructions, which can program the processing engine array 710 to perform various computations on the weights and the input data. The instructions can also be stored in the memory subsystem 704, in the memory banks 714 or in a separate instruction buffer. The processing engine array 710 can output intermediate results, which represent the outputs of individual layers of the neural network. In some cases, the activation engine 716, the vector engine 717, and/or pooling engine 718 may be enabled for computations called for by certain layers of the neural network. The accelerator 702 can store the intermediate results in the memory subsystem 704 for inputting into the processing engine array 710 to compute results for the next layer of the neural network. The processing engine array 710 can further output final results from a last layer of the neural network. The final results can be stored in the memory subsystem 704 and then be copied out to host processor memory or to another location.

Figure 8:
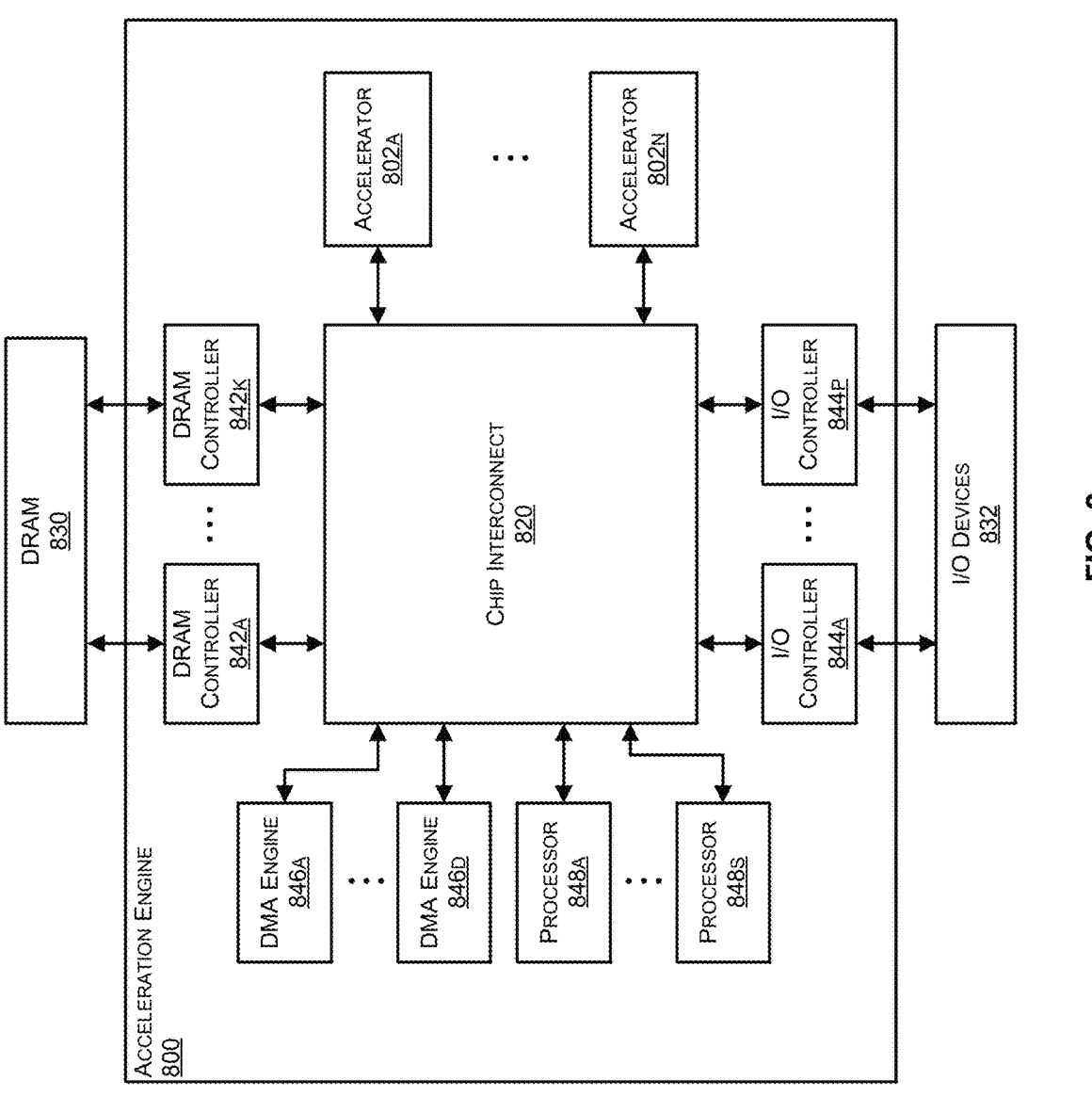
FIG. 8 illustrates a block diagram of an example of an acceleration engine.

FIG. 8 includes a block diagram that illustrates an example of an acceleration engine 800. The acceleration engine 800 is an example of an integrated circuit that can include one or more accelerators 802a-802n that may be similar to the accelerator illustrated in FIG. 7.

In the example of FIG. 8, the acceleration engine 800 includes multiple accelerators 802a-802n, each of which can perform a set of operations. In various examples, the accelerators 802a-802n are for particular types of operations, so that the accelerators 802a-802n can perform the operations much faster than when similar operations are performed by a general-purpose processor. In various examples, to perform a set of operations, input data on which the operations are to be performed must first be moved into the accelerators 802a-802n. Additionally, in some cases, program code is also moved into the accelerators 802a-802n, which programs the operations that the accelerators 802a-802n will perform on the data. In the illustrated example, the acceleration engine 800 includes n accelerators 802a-802n. Examples of accelerators that can be included in the acceleration engine 800 include graphics accelerators, floating point accelerators, neural network accelerators, and others. In various examples, the accelerators 802a-802n can each be the same (e.g., each of the is a graphics accelerator) or can be different (e.g., the accelerators 802a-802n include a graphics accelerator, a floating point accelerator, and neural network accelerator).

The example acceleration engine 800 further includes DRAM controllers 842a-842k for communicating with an external memory. The external memory is implemented, in this example, using DRAM 830. In the illustrated example, the acceleration engine 800 includes k DRAM controllers 842a-842k, each of which may be able to communicate with an independent set of banks of DRAM. In other examples, other types of RAM technology can be used for the external memory. The DRAM controllers 842a-842k can also be referred to as memory controllers.

In various examples, input data and/or program code for the accelerators 802a-802n can be stored in the DRAM 830. Different programs can cause the accelerators 802a-802n to perform different operations. For example, when one of the accelerators is a neural network accelerator, one program can configure the neural network accelerator to perform speech recognition while another program can configure the neural network accelerator to perform image recognition. In various examples, different accelerators 802a-802n can be programmed with different programs, so that each performs a different set of operations. In various examples, the processors 848a-848s can manage moving of program code from the DRAM 830 to the accelerators 802a-802n.

The example acceleration engine 800 further includes I/O controllers 844a-844p for communicating with I/O devices 832 in the system. The acceleration engine 800 can communicate with I/O devices over, for example, a processor bus. In some examples, the processor bus can be implemented using Peripheral Component Interconnect (PCI) and/or a variation of the PCI bus protocol. The processor bus can connect the acceleration engine 800 to I/O devices such as, for example, input and output devices, memory controllers, storage devices, and/or network interface cards, among other things. In some examples, the I/O controllers 844-844p can enable the acceleration engine 800 to act as an I/O device for a host processor. For example, the acceleration engine 800 can be the recipient of input data from the host processor, and a command indicating an operation to be performed on the input data (e.g., a particular computation or analysis). In the illustrated example, the acceleration engine 800 includes p I/O controllers 844a-844p, each of which may include a separate root complex and may communicate with a separate set of I/O devices 832. In other examples, other standardized bus protocols, such as Ultra Path Interconnect (UPI) can be used for the host bus. In other examples, a proprietary bus protocol can be used.

Movement of data in the acceleration engine 800 can be managed by one or more processors 848a-848s, which can also be referred to as data management processors. In the example of FIG. 8, the acceleration engine 800 includes s processors 848a-848s incorporated into the device (e.g., on the same silicon die). In other examples, the processors 848a-848s can be external to the acceleration engine 800 (e.g., on a different die and/or in a different package). In some examples, the processors 848a-848s can manage the movement of data from I/O devices 832 to the accelerators 802a-802n or the DRAM 830. For example, input data may be located at an I/O device 832 or in processor memory, and the processors 848a-848s can move the input from the I/O device 832 or processor memory into an accelerator or into DRAM 830. As another example, program code for the accelerators 802a-802n may be located on an I/O device 832 or in processor memory.

The example acceleration engine 800 further includes DMA engines 846a-846d that can move data between the accelerators 802a-802n, DRAM controllers 842a-842k, and I/O controllers 844a-844p. In the illustrated example, the acceleration engine 800 includes d DMA engines 846a-846d. In some implementations, the DMA engines 846a-846d can be assigned to specific tasks, such as moving data from the DRAM controllers 842a-842d to the accelerators 802a-802n, or moving data between the I/O controllers 844a-844p and the accelerators 802a-802n. These tasks can be assigned, for example, by enqueueing descriptors with the DMA engines 846a-846d, where a descriptor identifies an address for a block of data and an operation (e.g., a read or a write) to perform. A descriptor, for example, can direct a DMA engine to instruct a DMA controller to read a block of data from DRAM 830. A descriptor can, as a further example, instruct the DMA engine to write data, read by the DMA controller, to an accelerator. Further descriptors can be used to move data from an accelerator to DRAM 830.

In various examples, each of the processors 848a-848s can be responsible for managing the data movement for a different accelerator. In some examples, a processor may manage the data movement for more than one accelerator. Similarly, in various examples, each of the processors 848a-848s can be assigned to one or more DMA engines 846a-846d. In these and other examples, associations between processors 848a-848s, accelerators 802a-802n, and DMA engines 846a-846d are determined by program code being executed by each respective processor.

In the example acceleration engine 800, the various components can communicate over a chip interconnect 820. The chip interconnect 820 primarily includes wiring for routing data between the components of the acceleration engine 800. In some cases, the chip interconnect 820 can include a minimal amount of logic, such as multiplexers to control the direction of data, flip-flops for handling clock domain crossings, and timing logic.

Figure 9:
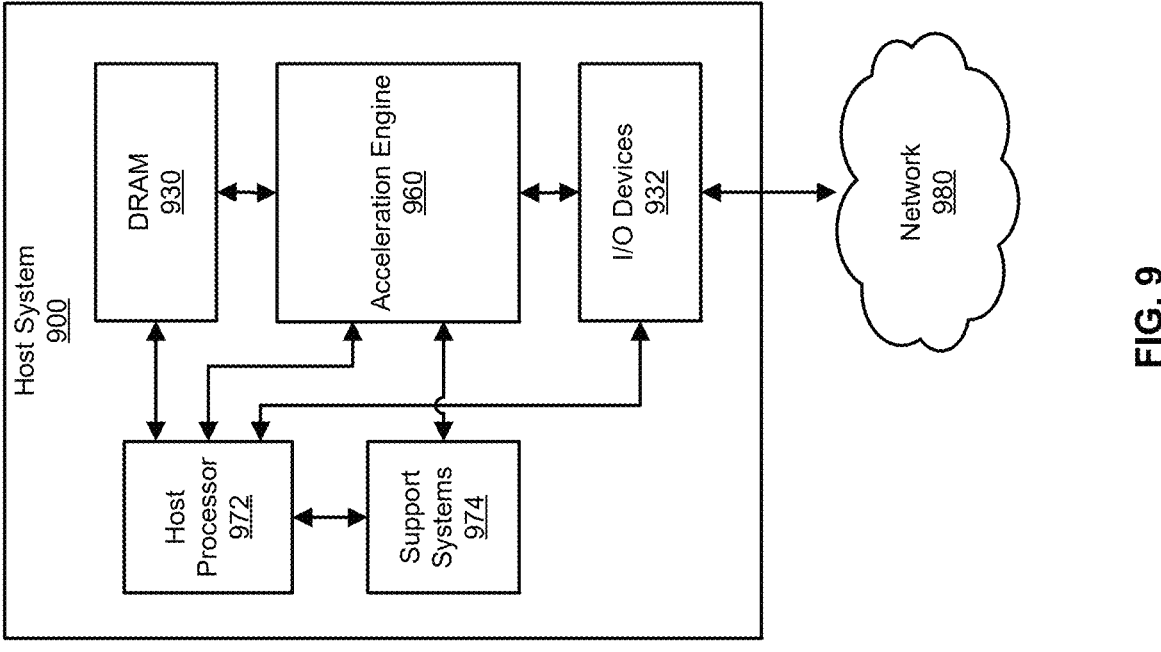
FIG. 9 illustrates a block diagram of an example of a host system.

FIG. 9 includes a block diagram that illustrates an example of a host system 900 in which an acceleration engine 960 can be used. The acceleration engine 960 of FIG. 9 is an example of a device that can include one or more accelerators such as is illustrated in FIG. 8. The example host system 900 of FIG. 9 includes the acceleration engine 960, a host processor 972, DRAM 930 or processor memory, I/O devices 932, and support systems 974. In various implementations, the host system 900 can include other hardware that is not illustrated here.

The host processor 972 is a general-purpose integrated circuit that is capable of executing program instructions. In some examples, the host processor 972 can include multiple processing cores. A multi-core processor may include multiple processing units within the same processor. In some examples, the host system 900 can include more than one host processor 972. In some examples, the host processor 972 and the acceleration engine 960 can be one chip, such as, one or more integrated circuits within the same package.

In various examples, the host processor 972 can communicate with other components in the host system 900 over one or more communication channels. For example, the host system 900 can include a host processor bus, which the host processor 972 can use to communicate with the DRAM 930, for example. As another example, the host system 900 can include an I/O bus, such as a PCI-based bus, over which the host processor 972 can communicate with the acceleration engine 960 and/or the I/O devices 932, for example. In various examples, the host system 900 can, alternatively or additionally, include other communication channels or busses, such as serial busses, power management busses, storage device busses, and so on.

In some examples, software programs executing on the host processor 972 can receive or generate input for processing by the acceleration engine 960. In some examples, the programs can select an appropriate neural network to execute for a given input. For example, a program may be for language translation, and can select one or more neural networks capable of speech recognition and/or machine translation. In these and other examples, the programs can configure the acceleration engine 960 with the neural network to execute, and/or can select a neural network processing engine on the acceleration engine 960 that has previously been configured to execute the desired neural network. In some examples, once the acceleration engine 960 has started an inference on input data, the host processor 972 can manage the movement of data (such as weights, instructions, intermediate results, results of conditional layers, and/or final results) into or out of the acceleration engine 960.

In some examples, a software program that is using the acceleration engine 960 to conduct an inference can read the result from a conditional layer from the acceleration engine 960 and/or from a storage location, such as in DRAM 930. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 930 is memory that is used by the host processor 972 for storage of program code that the host processor 972 is in the process of executing, as well as values that are being operated on. In some examples, the data for a neural network (e.g., weight values, instructions, and other data) can be all or partially stored in the DRAM 930. DRAM is a common term for processor memory, and though DRAM is volatile memory, processor memory can be volatile and/or non-volatile. Though not illustrated here, the host system 900 can include other volatile and non-volatile memories for other purposes. For example, the host system 900 can include a Read-Only Memory (ROM) that stores boot code for booting the host system 900 at power on, and/or Basic Input/Output System (BIOS) code.

Though not illustrated here, the DRAM 930 can store instructions for various programs, which can be loaded into and be executed by the host processor 972. For example, the DRAM 930 can be storing instructions for an operating system, one or more data stores, one or more application programs, one or more drivers, and/or services for implementing the features disclosed herein.

The operating system can manage and orchestrate the overall operation of the host system 900, such as scheduling tasks, executing applications, and/or controller peripheral devices, among other operations. In some examples, a host system 900 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 900. For example, some drivers can provide communication between the operating system and peripheral devices or I/O devices 932. Alternatively or additionally, some drivers may provide communication between application programs and the operating system, and/or application programs and peripheral devices accessible to the host system 900. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 932 can include hardware for connecting to user input and output devices, such as keyboards, mice, pens, tablets, voice input devices, touch input devices, displays or monitors, speakers, and printers, among other devices. The I/O devices 932 can also include storage drives and/or network interfaces for connecting to a network 980. For example, the host system 900 can use a network interface to communicate with storage devices, user terminals, other computing devices or servers, and/or other networks, among various examples.

In various examples, one or more of the I/O devices 932 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 900 or may be in an external enclosure. A storage device can be fixed (e.g., attached by screws) or removable (e.g., having a physical release mechanism and possibly a hot-plug mechanism).

Storage devices, the DRAM 930, and any other memory component in the host system 900 are examples of computer-readable storage media. Computer-readable storage media are physical mediums that are capable of storing data in a format that can be read by a device such as the host processor 972. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 932 can be PCI-based devices. In these examples, a PCI-based I/O device includes a PCI interface for communicating with the host system 900. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 974 can include hardware for coordinating the operations of the acceleration engine 960. For example, the support systems 974 can include a microprocessor that coordinates the activities of the acceleration engine 960, including moving data around on the acceleration engine 960. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 972. In some examples, the program executed by the microprocessor is stored on the hardware of microprocessor, or on a non-volatile memory chip in the host system 900. In some examples, the microprocessor and the acceleration engine 960 can be on chip, such as one integrated circuit on the same die and in the same package.

In some examples, the support systems 974 can be responsible for taking instructions from the host processor 972 when programs executing on the host processor 972 request the execution of a neural network. For example, the host processor 972 can provide the support systems 974 with a set of input data and a task that is to be performed on the set of input data. In this example, the support systems 974 can identify a neural network that can perform the task, and can program the acceleration engine 960 to execute the neural network on the set of input data. In some examples, the support systems 974 only needs to select an appropriate neural network processing engine of the neural network processor. In some examples, the support systems 974 may need to load the data for the neural network onto the acceleration engine 960 before the acceleration engine 960 can start executing the neural network. In these and other examples, the support systems 974 can further receive the output of executing the neural network, and provide the output back to the host processor 972.

In some examples, the operations of the support systems 974 can be handled by the host processor 972. In these examples, the support systems 974 may not be needed and can be omitted from the host system 900.

In various examples, the host system 900 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 900 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system of processing ranks in a logical ring formed by a set of rank groups each containing m number of processing ranks, m being an integer greater than 1, wherein each rank group includes:

a primary rank; and m−1 number of one or more secondary ranks coupled to the primary rank via an intranode interconnect, wherein each rank group is operable to perform operations for a collective computation, the operations including:

receiving, at a channel buffer of the primary rank of the rank group via the intranode interconnect of the rank group, an incoming data slice from a previous primary rank at m hops away on the logical ring;

reducing, by a direct memory access (DMA) engine of the primary rank, a primary rank data slice from an input buffer of the primary rank, a secondary rank data slice via the intranode interconnect from an input buffer of each secondary rank, and the incoming data slice from the channel buffer of the primary rank to generate an outgoing data slice; and transferring, by the DMA engine of the primary rank, the outgoing data slice from the primary rank of the rank group to a next primary rank at m hops away on the logical ring.

2. The system of claim 1, wherein the operations further include:

at each rank group:

receiving, at an output buffer of the primary rank of the rank group via an intranode interconnect of the rank group, another incoming data slice from the previous primary rank on the logical ring;

transferring, by a DMA engine of each secondary rank, the other incoming data slice from the output buffer of the primary rank to an output buffer of a corresponding secondary rank; and transferring, by the DMA engine of the primary rank, the other incoming data slice as another outgoing data slice from the primary rank of the rank group to a next primary rank on the logical ring.

3. The system of claim 1, wherein the collective computation is an all-reduce operation.

4. The system of claim 1, wherein the system of processing ranks is implemented using a plurality of system-on-chips that each include multiple rank groups.

5. A method for performing a collective compute operation on tensor data in a logical ring of processing ranks formed by a set of rank groups each containing m number of processing ranks including a primary rank and one or more secondary ranks, m being an integer greater than 1, the method comprising:

at each rank group:

receiving, at the primary rank of the rank group via an intranode interconnect of the rank group, an incoming data slice from a previous primary rank at m hops away on the logical ring;

performing data transfer between the primary rank and each secondary rank of the rank group; and transferring an outgoing data slice from the primary rank of the rank group to a next primary rank at m hops away on the logical ring.

6. The method of claim 5, wherein the incoming data slice is received at a channel buffer of the primary rank.

7. The method of claim 6, wherein performing the data transfer between the primary rank and each secondary rank of the rank group includes obtaining, by a direct memory access (DMA) engine of the primary rank, a primary rank data slice from an input buffer of the primary rank, a secondary rank data slice from an input buffer of each secondary rank, and the incoming data slice from the channel buffer of the primary rank.

8. The method of claim 7, wherein the outgoing data slice is generated by reducing, by the DMA engine, the incoming data slice, the primary rank data slice, and each secondary rank data slice.

9. The method of claim 8, wherein the outgoing data slice is transferred to a channel buffer of the next primary rank on the logical ring.

10. The method of claim 9, wherein the collective compute operation is a reduce-scatter operation.

11. The method of claim 5, wherein the incoming data slice is received at an output buffer of the primary rank.

12. The method of claim 11, wherein performing the data transfer between the primary rank and each secondary rank of the rank group includes obtaining, by a DMA engine of each secondary rank, the incoming data slice from the output buffer of the primary rank, and transferring the incoming data slice to an output buffer of each secondary rank.

13. The method of claim 12, wherein the incoming data slice from the output buffer of the primary rank is provided as the outgoing data slice.

14. The method of claim 13, wherein the outgoing data slice is transferred to an output buffer of the next primary rank on the logical ring.

15. The method of claim 14, wherein the collective compute operation is an all-gather operation.

16. The method of claim 5, wherein each rank group is implemented as an integrated circuit die containing m processing ranks.

17. The method of claim 5, wherein the rank group is part of a system-on-chip containing multiple rank groups.

18. A non-transitory computer readable medium having stored therein instructions that, when executed by one or more processors, cause the one or more processors to perform operations for a collective computation on tensor data in a logical ring of processing ranks formed by a set of rank groups each containing m number of processing ranks including a primary rank and one or more secondary ranks, m being an integer greater than 1, the operations including:

at each rank group:

receiving, at the primary rank of the rank group via an intranode interconnect of the rank group, an incoming data slice from a previous primary rank at m hops away on the logical ring;

performing data transfer between the primary rank and each secondary rank of the rank group; and transferring an outgoing data slice from the primary rank of the rank group to a next primary rank at m hops away on the logical ring.

19. The non-transitory computer readable medium of claim 18, wherein the operations include generating the outgoing data slice by reducing the incoming data slice, a primary rank data slice from the primary rank, and a secondary rank data slice obtained via the intranode interconnect from each secondary rank of the rank group.

20. The non-transitory computer readable medium of claim 18, wherein the data transfer between the primary rank and each secondary rank of the rank group includes transferring the incoming data slice from the primary rank to each secondary rank via the intranode interconnect of the rank group.

* * * * *